(12) United States Patent
Zhang et al.

(10) Patent No.: US 9,630,575 B2
(45) Date of Patent: Apr. 25, 2017

(54) PANEL ASSEMBLY WITH NOISE ATTENUATION SYSTEM

(71) Applicant: GM GLOBAL TECHNOLOGY OPERATIONS LLC, Detroit, MI (US)

(72) Inventors: Qijun Zhang, Canton, MI (US); Mark A. Stebbins, Bloomfield Hills, MI (US); Christopher A. Stirlen, Milford, MI (US); Michael E. McGuire, Milford, MI (US); Andrew J Baines, Novi, MI (US); John E Howard, Fenton, MI (US); Joseph A. Schudt, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/870,940

(22) Filed: Sep. 30, 2015

(65) Prior Publication Data

US 2017/0088063 A1 Mar. 30, 2017

(51) Int. Cl.
*B60R 13/08* (2006.01)
*B62D 25/06* (2006.01)
*G10K 11/168* (2006.01)

(52) U.S. Cl.
CPC .......... *B60R 13/0815* (2013.01); *B62D 25/06* (2013.01); *G10K 11/168* (2013.01)

(58) Field of Classification Search
USPC .................................. 296/211, 214; 181/290
See application file for complete search history.

(56) References Cited

U.S. PATENT DOCUMENTS

| 2,541,159 | A | * | 2/1951 | Geiger | E04B 1/84 181/208 |
| 4,177,876 | A | * | 12/1979 | Pujolle | E04B 1/8409 181/284 |
| 4,340,129 | A | * | 7/1982 | Salyers | B32B 5/18 181/200 |
| 4,425,981 | A | * | 1/1984 | Kiesewetter | E01F 8/0035 181/286 |
| 4,479,992 | A | * | 10/1984 | Haeseker | B29D 24/007 181/288 |
| 4,493,390 | A | * | 1/1985 | Pagano | F02B 63/04 165/52 |
| 4,553,631 | A | * | 11/1985 | Panza | G10K 11/16 181/286 |
| 4,630,707 | A | * | 12/1986 | Yukawa | B60R 13/0815 181/288 |

(Continued)

*Primary Examiner* — Dennis H Pedder
(74) *Attorney, Agent, or Firm* — Quinn IP Law

(57) ABSTRACT

A panel assembly includes a first panel defining a surface, and a boom attenuation panel. The boom attenuation panel includes a circumferential edge, and a central portion. The boom attenuation panel is attached to the surface of the first panel, along the circumferential edge of the boom attenuation panel. The central portion of the boom attenuation panel is spaced from the surface of the first panel a gap distance to form a gas chamber between the surface of the first panel and the central portion of the boom attenuation panel. The gas chamber contains a gas that is moveable within the gas chamber in response to wave-like motion of the first panel. Movement of the gas increases the effective acoustic mass of the boom attenuation panel, and damped the wave-like motion of the first panel, which operates to reduce noise generated from the wave-like motion of the first panel.

11 Claims, 2 Drawing Sheets

(56) References Cited

U.S. PATENT DOCUMENTS

| | | | | |
|---|---|---|---|---|
| 4,705,139 A * | 11/1987 | Gahlau | G10K 11/172 | 181/286 |
| 4,741,945 A * | 5/1988 | Brant | B32B 5/18 | 296/211 |
| 4,957,797 A * | 9/1990 | Maeda | B32B 5/18 | 296/211 |
| 5,352,532 A * | 10/1994 | Kline | B29C 45/34 | 428/142 |
| 5,509,247 A * | 4/1996 | Fortez | B60R 13/0225 | 181/284 |
| 5,587,564 A * | 12/1996 | Stief | G10K 11/172 | 181/286 |
| 5,845,458 A * | 12/1998 | Patel | B60R 13/0225 | 296/210 |
| 5,851,626 A * | 12/1998 | McCorry | B60N 3/048 | 181/288 |
| 6,179,086 B1 * | 1/2001 | Bansemir | G10K 11/172 | 181/198 |
| 6,186,270 B1 * | 2/2001 | Roller | G10K 11/168 | 181/286 |
| 6,463,844 B1 * | 10/2002 | Wang | A21B 3/13 | 99/400 |
| 6,568,135 B1 * | 5/2003 | Yokoyama | E01F 8/0094 | 181/208 |
| 6,638,640 B2 * | 10/2003 | Jee | B32B 1/08 | 181/208 |
| 7,128,365 B2 * | 10/2006 | Kiesewetter | B62D 25/06 | 296/191 |
| 8,011,472 B2 * | 9/2011 | Tanase | G10K 11/172 | 181/207 |
| 8,360,201 B2 * | 1/2013 | Tanase | E04B 1/8404 | 181/151 |
| 2005/0155815 A1 * | 7/2005 | Sasaki | B60R 13/0815 | 181/151 |
| 2005/0189165 A1 * | 9/2005 | Mathur | G10K 11/175 | 181/207 |
| 2008/0093164 A1 * | 4/2008 | Hiyama | G10K 11/172 | 181/288 |
| 2008/0128200 A1 * | 6/2008 | Tsugihashi | B60J 5/0418 | 181/284 |
| 2009/0084627 A1 * | 4/2009 | Tsugihashi | B60J 5/00 | 181/290 |
| 2009/0120717 A1 * | 5/2009 | Tanase | G10K 11/172 | 181/284 |
| 2009/0205901 A1 * | 8/2009 | Tanase | G10K 11/172 | 181/151 |
| 2010/0044148 A1 * | 2/2010 | Tanase | G10K 11/172 | 181/198 |
| 2010/0089691 A1 * | 4/2010 | Nakamura | B60R 13/011 | 181/286 |
| 2010/0095622 A1 * | 4/2010 | Niemoller | B32B 3/12 | 52/407.5 |
| 2011/0056763 A1 * | 3/2011 | Tanase et al. | B60R 13/0815 | 181/295 |

* cited by examiner

PANEL ASSEMBLY WITH NOISE ATTENUATION SYSTEM

TECHNICAL FIELD

The disclosure generally relates to a panel assembly, and more specifically to a body panel assembly for a body of a vehicle for attenuating cabin noise.

BACKGROUND

Minor movement of panels can generate and/or perpetuate noise. In instances where panels form a cabin area, such as the exterior body panels of a vehicle, any noise caused or transferred by the movement of the panels may travel into the cabin area, and negatively affect the driving experience of the passengers within the cabin area. It is therefore desirable to attenuate the noise generated or transferred by the body panels, to improve the driving experience of the passengers.

SUMMARY

A panel assembly is provided. The panel assembly includes a first panel defining a surface, and a boom attenuation panel. The boom attenuation panel includes a circumferential edge, and a central portion. The boom attenuation panel is attached to the surface of the first panel, along the circumferential edge of the boom attenuation panel. The central portion of the boom attenuation panel is spaced from the surface of the first panel a gap distance to form a gas chamber between the surface of the first panel and the central portion of the boom attenuation panel.

A body panel assembly for a vehicle is also provided. The body panel assembly includes a first panel defining an exterior body surface and an interior surface, and a boom attenuation panel. The boom attenuation panel includes a circumferential edge, and a central portion. The boom attenuation panel is attached to the interior surface of the first panel, along the circumferential edge of the boom attenuation panel. The central portion of the boom attenuation panel is spaced from the interior surface of the first panel a gap distance to form a gas chamber between the interior surface of the first panel and the central portion of the boom attenuation panel. The gas chamber contains a gas that is moveable within the gas chamber in response to wave-like motion of the first panel. Movement of the gas increases the effective acoustic mass of the boom attenuation panel, and damped the wave-like motion of the first panel, which operates to reduce noise generated from the wave-like motion of the first panel.

Accordingly, as the first panel moves in the wave-like motion, a portion of the first panel adjacent the gas chamber will raise upward toward the central portion of the boom attenuation panel, thereby causing the gas within the gas chamber to rush or move within the gas chamber. Due to the large ratio between the area of the central portion of the boom attenuation panel and the gap distance, a small movement of the first panel causes a large movement of the gas laterally across the gas chamber. The movement of the gas across the gas chamber increases the effective acoustic mass of the boom attenuation panel, as well as damping the movement of the first panel, thereby attenuating the propagation of noise from the first panel.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a vehicle is generally shown at 20. The vehicle 20 is equipped with a panel assembly 22, which is configured to attenuate noise within a cabin 24 of the vehicle 20. The vehicle 20 is shown in the exemplary embodiment as an automobile. However, it should be appreciated that the vehicle 20 may include any other type and/or configuration of vehicle, such as an airplane, a boat, train, tractor, etc. Furthermore, it should be appreciated that the panel assembly 22 may be incorporated into a system other than a vehicle 20, and that the panel assembly 22 does not have to be part of a vehicle 20, such as the exemplary embodiment shown in the Figures.

Figure 1:
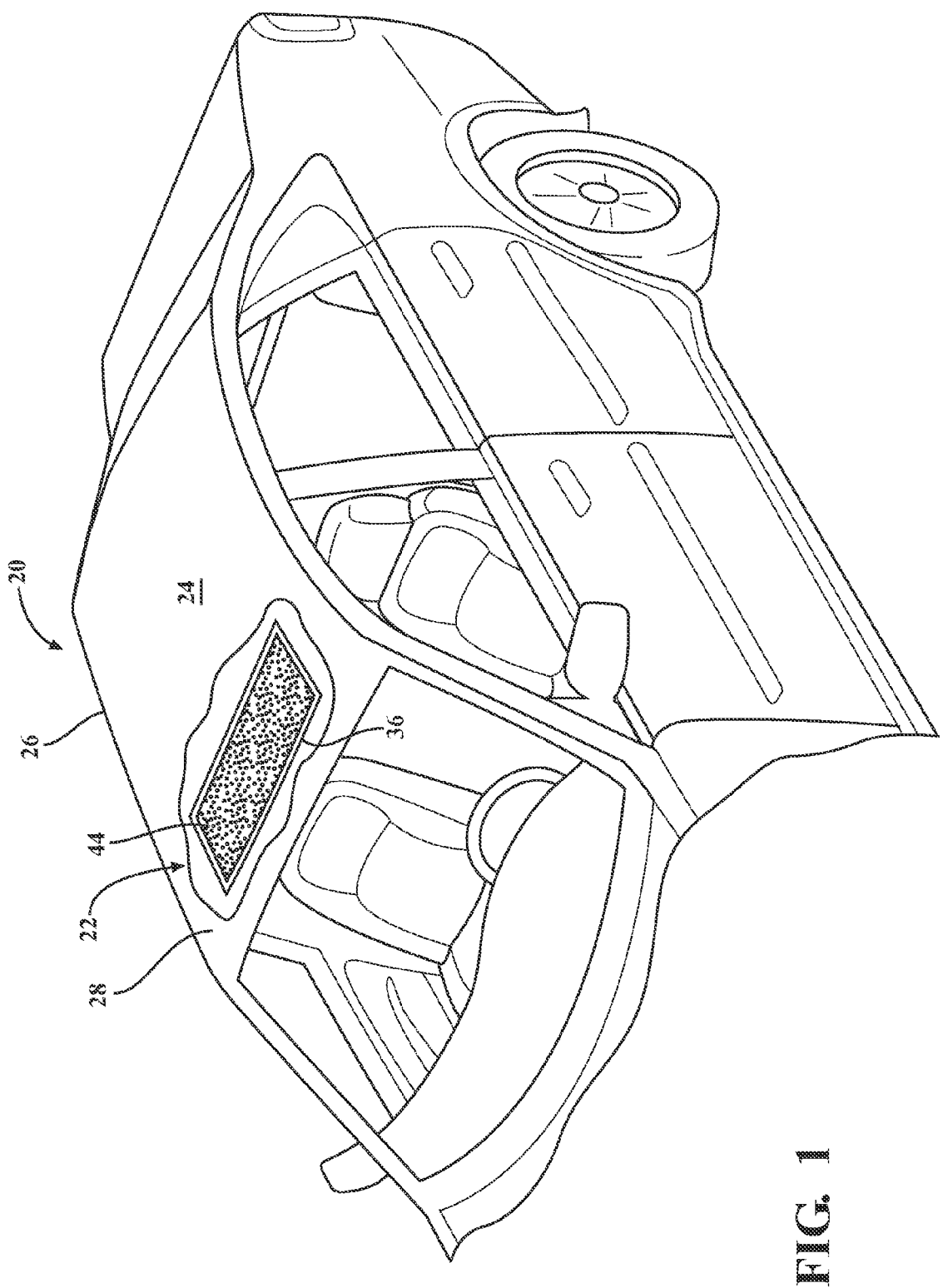
FIG. 1 is a schematic perspective view of a vehicle.

Referring to FIG. 1, the vehicle 20 includes a body 26 that includes several panels, such as a roof panel shown at 28. While the panel assembly 22 may be defined or configured as any panel of the body 26 of the vehicle 20, the panel assembly 22 is specifically shown and discussed herein with reference to the roof panel 28 shown in the Figures. However, it should be appreciated that the panel assembly 22 is not limited to applications associated with the roof panel 28, and may be configured for any other panel of the body 26.

Figure 2:
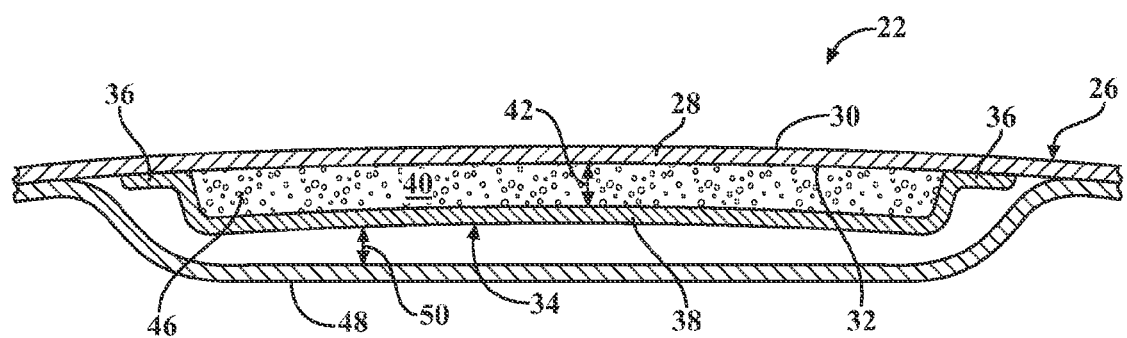
FIG. 2 is a schematic cross sectional view of the vehicle.

The roof panel is hereinafter referred to as the first panel 28 of the panel assembly 22. Referring to FIGS. 1 and 2, the first panel 28 includes an exterior surface 30 which defines an exterior of the body 26, and an interior surface 32 disposed opposite the exterior surface 30. The first panel 28 may be manufactured from any material suitable for the specific use of the panel assembly 22. For example, in the exemplary embodiment shown in the Figures as an automobile, the first panel 28 may include and be manufactured from a metal material, such as steel or aluminum. However, in other applications, the first panel 28 of the panel assembly 22 may include and be manufactured from some other material, such as plastic, fiberglass, or carbon fiber reinforced polymer.

The panel assembly 22 includes a boom attenuation panel 34 that is attached to the first panel 28. As shown in the Figures, the boom attenuation panel 34 is disposed adjacent and attached to the interior surface 32 of the first panel 28. However, the boom attenuation panel 34 may alternatively be disposed adjacent and attached to the exterior surface 30 of the first panel 28. The boom attenuation panel 34 defines a circumferential edge 36 extending around a perimeter of the boom attenuation panel 34. The boom attenuation panel 34 may include any plan shape suitable for the specific shape and/or configuration of the first panel 28, and as such, the circumferential edge 36 of the boom attenuation panel 34 may include any shape corresponding to the shape of the boom attenuation panel 34. For example, the boom attenuation panel 34 may include a shape that is round, oval, rectangular, polygonal, etc. Furthermore, the boom attenuation panel 34 may include one or more slots, extensions, wings, etc., As shown in the exemplary embodiment in FIG. 1, the boom attenuation panel 34 is substantially rectangular shaped. However, it should be appreciated that the shape of the boom attenuation panel 34 shown in FIG. 1 is only exemplary, and the shape of the boom attenuation panel 34 may vary from the exemplary embodiment shown and described herein.

As noted above, the boom attenuation panel 34 includes the circumferential edge 36 which extends around the outer perimeter of the boom attenuation panel 34. The circumferential edge 36 surrounds and is disposed about a central portion 38 of the boom attenuation panel 34. As shown in FIG. 2, the circumferential edge 36 is vertically spaced from the central portion 38. Accordingly, as viewed in FIG. 2, it should be appreciated that the central portion 38 is lowered from the circumferential edge 36, relative to the interior surface 32 of the first panel 28, to form a gas chamber 40 between the interior surface 32 of the first panel 28 and the central portion 38 of the boom attenuation panel 34, described in greater detail below.

The boom attenuation panel 34 may include and be manufactured from a rigid material. The material used to form and/or construct the boom attenuation panel 34 must be capable of maintaining an initial shape over time, and should capable of insulating against noise transmission, and/or capable of absorbing noise. Preferably, the boom attenuation panel 34 includes and is manufactured form a non-metal material. More preferably, the boom attenuation panel 34 includes and is manufactured from a fiber reinforced cardboard material. However, it should be appreciated that the boom attenuation panel 34 may be manufactured from some other material capable of performing the functions of the boom attenuation panel 34 as described herein.

As shown, the boom attenuation panel 34 is attached to the interior surface 32 of the first panel 28, along the circumferential edge 36 of the boom attenuation panel 34. Accordingly, the circumferential edge 36 of the boom attenuation panel 34 is attached to the interior surface 32 of the first panel 28, whereas the central portion 38 of the boom attenuation panel 34 is not directly attached to the interior surface 32 of the first panel 28. The circumferential edge 36 of the boom attenuation panel 34 may be attached to the first panel 28 in any suitable manner. For example, the boom attenuation panel 34 may be bonded or glued to the first panel 28 with an adhesive, taped to the first panel 28 with an adhesive tape, attached via a plurality of fasteners, or in any other suitable manner. The circumferential edge 36 may include a lip or flange disposed adjacent the interior surface 32 of the first panel 28 to facilitate the attachment of the boom attenuation panel 34 to the first panel 28.

As noted above, the central portion 38 of the boom attenuation panel 34 is spaced from the interior surface 32 of the first panel 28 to define a gas chamber 40 between the interior surface 32 of the first panel 28 and the central portion 38 of the boom attenuation panel 34. The central portion 38 of the boom attenuation panel 34 is spaced from the interior surface 32 of the first panel 28 a gap distance 42 to form the gas chamber 40. The central portion 38 of the boom attenuation panel 34 defines a pocket area 44, i.e., an area of the central portion 38. The gap distance 42 may be substantially consistent across the pocket area 44. Alternatively, the gap distance 42 may vary across the pocket area 44 of the central portion 38. The pocket area 44 is indicated by the hatched area shown in FIG. 1. Preferably, the gap distance 42 is preferably between the range of 1.5 mm and 5.0 mm. However, the gap distance 42 may vary from the exemplary range described herein.

As shown in FIG. 2, the gas chamber 40 contains a gas 46. Preferably, the gas 46 is air. However, other inert gases may be used instead. The gas 46 within the gas chamber 40 is moveable within the gas chamber 40 in response to wave-like motion of the first panel 28. Movement of the gas 46 within the gas chamber 40 increases the effective acoustic mass of the boom attenuation panel 34, which helps to damped the wave-like motion of the first panel 28, and reduce noise generated from the wave-like motion of the first panel 28. Because of the large ratio of the pocket area 44 to gap distance 42, a very small vertical movement of the first panel 28 causes or generates a large fluid movement of the gas 46 laterally or horizontally across the first panel 28. Moving the gas 46 within the gas chamber 40 requires energy, thereby absorbing energy from the first panel 28 as it moves in the wave-like motion, and thereby reducing the frequency and amplitude of the wave-like motion of the first panel 28. Reducing the frequency and the amplitude of the wave-like motion of the first panel 28, reduces the noise generated by or caused by the first panel 28 as a result of the wave-like motion, which may be transferred into the cabin 24 of the vehicle 20. Accordingly, the boom attenuation panel 34, and the gas 46 contained within the gas chamber 40 between the boom attenuation panel 34 and the interior surface 32 of the first panel 28, operates to reduce noise within the cabin 24 of the vehicle 20.

The boom attenuation panel 34 is continuously attached to the first panel 28, around the entire circumferential edge 36 of the boom attenuation panel 34, to completely seal the gas chamber 40 and prevent the escape of the gas 46 from the gas chamber 40, between the circumferential edge 36 of the boom attenuation panel 34 and the surface of the first panel 28.

Referring to FIG. 2, the panel assembly 22 may further include a trim panel 48. The trim panel 48 is disposed adjacent the boom attenuation panel 34, such that the boom attenuation panel 34 is disposed between the trim panel 48 and the first panel 28. As shown in FIG. 2 and described with reference to the exemplary embodiment of a vehicle 20, the trim panel 48 may be referred to as a headliner of the vehicle 20. The trim panel 48 is spaced from the boom attenuation panel 34 a separation distance 50. Accordingly, the trim panel 48 is attached to the first panel 28 in such a manner so as not to contact the boom attenuation panel 34, in order to not interfere with the operation of the boom attenuation panel 34 in attenuating noise from the first panel 28. Preferably, the separation distance 50 is equal to or greater than 1.0 mm. However, it should be appreciated that the separation distance 50 may differ from the exemplary distance described herein.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A panel assembly comprising:
   a first panel defining a surface;
   a boom attenuation panel having a circumferential edge and a central portion;
   wherein the boom attenuation panel is attached to the surface of the first panel along the circumferential edge of the boom attenuation panel;
   wherein the central portion of the boom attenuation panel is disposed in a generally parallel relationship with the surface of the first panel, and is spaced from the surface of the first panel by a gap distance to form a gas chamber between the surface of the first panel and the central portion of the boom attenuation panel in order to reduce noise generated from a wave-like motion of the first panel; and
   wherein the gas chamber contains a gas that is moveable within the gas chamber in response to wave-like motion of the first panel;
   wherein the boom attenuation panel is continuously attached to the first panel, around the entire circumferential edge of the boom attenuation panel, to completely seal the gas chamber and prevent the escape of the gas from the gas chamber between the circumferential edge of the boom attenuation panel and the surface of the first panel;
   wherein the boom attenuation panel includes and is manufactured from a fiber reinforced cardboard material.

2. The panel assembly set forth in claim 1 wherein the gap distance is between the range of 1.5 mm and 5.0 mm.

3. The panel assembly set forth in claim 1 further comprising a trim panel disposed adjacent the boom attenuation panel, with the boom attenuation panel disposed between the trim panel and the first panel.

4. The panel assembly set forth in claim 3 wherein the trim panel is spaced from the boom attenuation panel by a separation distance.

5. The panel assembly set forth in claim 4 wherein the separation distance is equal to or greater than 1.0 mm.

6. The panel assembly set forth in claim 1 wherein the first panel is an exterior body panel of a vehicle.

7. The panel assembly set forth in claim 1 wherein the first panel includes and is manufactured from a metal material.

8. The panel assembly set forth in claim 1 wherein the boom attenuation panel is bonded to the first panel with an adhesive.

9. A vehicle comprising:
   a body having a roof panel defining an exterior body surface and an interior surface;
   a boom attenuation panel having a circumferential edge and a central portion;
   a trim panel disposed adjacent the boom attenuation panel, with the boom attenuation panel disposed between the trim panel and the roof panel;
   wherein the boom attenuation panel is attached to the interior surface of the roof panel along the circumferential edge of the boom attenuation panel;
   wherein the central portion of the boom attenuation panel is disposed in a generally parallel relationship with the surface of the roof panel, and is spaced from the interior surface of the roof panel by a gap distance to form a gas chamber between the interior surface of the roof panel and the central portion of the boom attenuation panel;
   wherein the gas chamber contains a gas that is moveable within the gas chamber in response to wave-like motion of the roof panel, to increase the effective acoustic mass of the boom attenuation panel and dampen the wave-like motion of the roof panel, to reduce noise generated from the wave-like motion of the roof panel; and
   wherein the boom attenuation panel is continuously attached to the roof panel, around the entire circumferential edge of the boom attenuation panel, to completely seal the gas chamber and prevent the escape of the gas contained in the gas chamber between the circumferential edge of the boom attenuation panel and the interior surface of the roof panel.

10. The vehicle set forth in claim 9 wherein the gap distance is between the range of 1.5 mm and 5.0 mm.

11. The vehicle set forth in claim 10 wherein the trim panel is spaced from the boom attenuation panel by a separation distance that is equal to or greater than 1.0 mm.

* * * * *